United States Patent
Choi et al.

(10) Patent No.: US 9,602,832 B2
(45) Date of Patent: *Mar. 21, 2017

(54) IMAGE ENCODING/DECODING APPARATUS AND METHOD

(71) Applicant: ELECTRONICS AND TELECOMMUNICATIONS RESEARCH INSTITUTE, Daejeon (KR)

(72) Inventors: Hae-Chul Choi, Daejeon (KR); Se Yoon Jeong, Daejeon (KR); Sukhee Cho, Daejeon (KR); Hui Yong Kim, Daejeon (KR); Jinho Lee, Daejeon (KR); Hahyun Lee, Seoul (KR); Sung-Chang Lim, Daejeon (KR); Jongho Kim, Daejeon (KR); Jin Soo Choi, Daejeon (KR); Jin Woo Hong, Daejeon (KR); Jin Woong Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/553,602

(22) Filed: Nov. 25, 2014

(65) Prior Publication Data

US 2015/0078452 A1 Mar. 19, 2015

Related U.S. Application Data

(63) Continuation of application No. 12/976,346, filed on Dec. 22, 2010, now Pat. No. 8,953,686.

(30) Foreign Application Priority Data

Dec. 23, 2009 (KR) .................. 10-2009-0129963
Feb. 4, 2010 (KR) .................. 10-2010-0010359

(51) Int. Cl.
*H04N 11/02* (2006.01)
*H04N 19/513* (2014.01)
*H04N 19/52* (2014.01)

(52) U.S. Cl.
CPC ........... *H04N 19/513* (2014.11); *H04N 19/52* (2014.11)

(58) Field of Classification Search
CPC ........................................ H04N 19/52
(Continued)

(56) References Cited

U.S. PATENT DOCUMENTS

2003/0123547 A1 7/2003 Song
2005/0025244 A1* 2/2005 Lee .................. H04N 5/145
375/240.16

(Continued)

FOREIGN PATENT DOCUMENTS

JP 2006-279573 A 10/2006
KR 10-2004-0031556 A 4/2004
(Continued)

OTHER PUBLICATIONS

Korean Office Action issued on Aug. 19, 2013, in counterpart Korean Application No. 10-2010-0121200 (4 pages, in Korean).

(Continued)

*Primary Examiner* — Christopher S Kelley
*Assistant Examiner* — Jonathan Messmore
(74) *Attorney, Agent, or Firm* — NSIP Law

(57) ABSTRACT

Provided is an image encoding/decoding apparatus and method. The image encoding apparatus may include a motion vector prediction unit to perform a prediction with respect to an arbitrary motion vector of a current block within an image, using at least one of vector information of a motion vector corresponding to an adjacent block and vector information of a previous motion vector of the current (Continued)

block, and a differential determination unit to determine differential information of a motion vector of the current block based on the motion vector predicted in the motion vector prediction unit and an actual motion vector of the current block.

2 Claims, 12 Drawing Sheets

(58) Field of Classification Search
USPC .................................................. 375/240.16
See application file for complete search history.

(56) References Cited

U.S. PATENT DOCUMENTS

| 2009/0034621 | A1* | 2/2009 | Joch | H04N 19/51 |
| | | | | 375/240.16 |
| 2009/0067504 | A1* | 3/2009 | Zheludkov | H04N 19/56 |
| | | | | 375/240.16 |
| 2009/0074064 | A1 | 3/2009 | Jeon | |
| 2009/0074067 | A1* | 3/2009 | Jeon | H04N 19/521 |
| | | | | 375/240.15 |
| 2010/0195723 | A1 | 8/2010 | Ikai et al. | |

FOREIGN PATENT DOCUMENTS

| KR | 10-0494829 B1 | 6/2005 |
| KR | 10-0579542 B1 | 5/2006 |
| KR | 10-2008-0041741 A | 5/2008 |
| KR | 10-2009-0027091 A | 3/2009 |
| KR | 10-2009-0034697 A | 4/2009 |

OTHER PUBLICATIONS

Korean Office Action issued on Jan. 15, 2014, in counterpart Korean Application No. 10-2013-0060131 (4 pages, in Korean).
Korean Notice of Allowance mailed Jul. 29, 2014 in counterpart Korean Application No. KR 10-2013-0157351 (6 pages, in Korean).

* cited by examiner

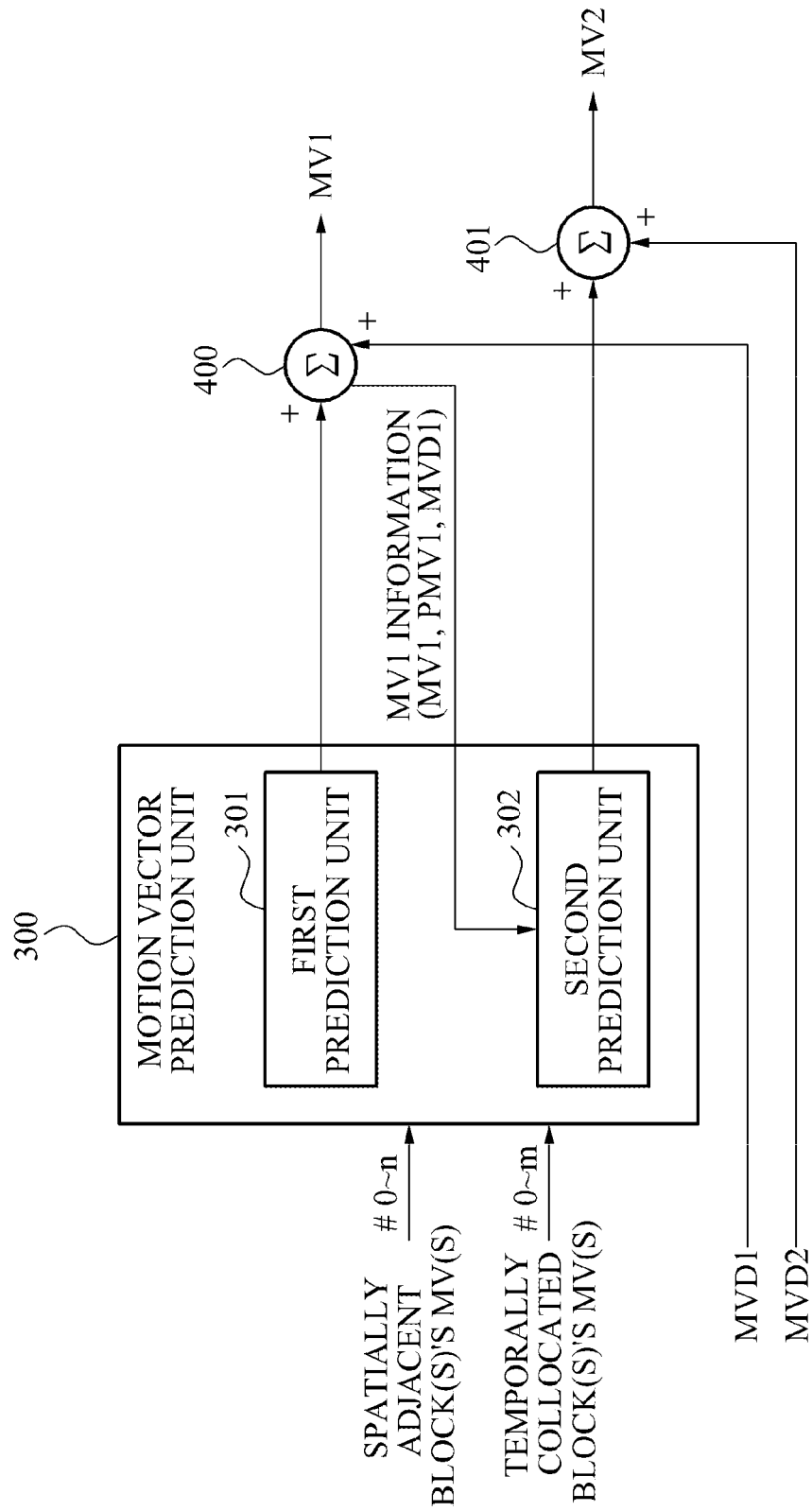

IMAGE ENCODING/DECODING APPARATUS AND METHOD

CROSS-REFERENCE TO RELATED APPLICATION(S)

This application is a Continuation application of U.S. application Ser. No. 12/976,346, filed Dec. 22, 2010, which claims the benefit under 35 U.S.C. §119(a) of Korean Patent Application Nos. 10-2009-0129963, filed on Dec. 23, 2009, and 10-2010-0010359, filed on Feb. 4, 2010, in the Korean Intellectual Property Office, the entire disclosures of which are incorporated herein by reference for all purposes.

BACKGROUND

1. Field of the Invention

Embodiments of the present invention relate to an image encoding/decoding apparatus and method, and more particularly, to an image encoding/decoding apparatus and method, which may provide a method for predicting an arbitrary motion vector of a current block within an image.

2. Description of the Related Art

Recently, along with a significant increase in high quality digital video contents, demands for transmission of the high quality digital video contents and for play services have increased.

To meet the demands, technologies that may encode and compress video contents with a high bit rate and a high resolution may become very important.

H.264/AVC, a video coding standard, may use, as a prediction signal, a motion vector (MV) of an adjacent block having been previously encoded to encode a motion vector in a B (Bi-predictive) block having two motion vectors. Hereinafter, the two motion vectors may be referred to as a first motion vector and a second motion vector, respectively.

FIG. 1 is a diagram illustrating a block predicted by a conventional video encoding scheme.

Referring to FIG. 1, a current block 10 to be encoded and a plurality of adjacent blocks 11 to 14 neighboring the current block 10 are illustrated. In this example, the adjacent blocks may be reconstructed blocks neighboring the current block, and an encoder and a decoder may include vector information associated with motion vectors with respect to the adjacent blocks. The current block may be a target block to be currently encoded.

In this instance, the plurality of adjacent blocks 11 to 14 may have at least one of vector information such as an actual motion vector, a predicted motion vector, and a differential signal between the actual motion vector and the predicted motion vector. Specifically, the adjacent block A 11 has a first motion vector, that is, MV_A_1 and a second motion vector, that is, MV_A_2, and the adjacent block B 13 has a first motion vector, that is, MV_B_1 and a second motion vector, that is, MV_B_2. Similarly, the adjacent block C 14 has a first motion vector, that is, MV_C_1 and a second motion vector, that is, MV_C_2, and the adjacent block D 12 has a first motion vector, that is, MV_D_1 and a second motion vector, that is, MV_D_2.

According to a conventional prediction method for a first motion vector of the current block 10, when the adjacent blocks use the same reference picture list and the same reference picture index as the current block, a median prediction may be realized by the following Equation.

$$PMV1 = median\{MV\_A\_1, MV\_B\_1, MV\_C\_1\} \quad \text{[Equation]}$$

Consequently, the first motion vector of the current block 10 may be calculated by the respective first motion vectors (MV_A_1, MV_B_1, and MV_C_1) of the plurality of adjacent blocks 11 to 14.

Also, a conventional prediction method for a second motion vector of the current block 10 may be realized by the following Equation.

$$PMV2 = median\{MV\_A\_2, MV\_B\_2, MV\_C\_2\} \quad \text{[Equation]}$$

Consequently, the second motion vector of the current block 10 may be calculated by the respective second motion vectors (MV_A_2, MV_B_2, and MV_C_2) of the plurality of adjacent blocks 11 to 14.

In this manner, the conventional video encoding method may use only a vector corresponding to a currently predicted motion vector from among a plurality of motion vectors of the adjacent blocks, and may fail to consider correlation and similarity among the plurality of motion vectors.

SUMMARY

An aspect of the present invention provides an image encoding/decoding apparatus and method that may consider a motion vector of an adjacent block and a previous motion vector when predicting an arbitrary motion vector of a current block.

Another aspect of the present invention provides an image encoding/decoding apparatus and method that may scale vector information of a motion vector of an adjacent block and of a previous motion vector, and use the scaled vector information.

Still another aspect of the present invention provides an image encoding/decoding apparatus and method that may select reference information to be used when predicting a motion vector based on similarity estimated among motion vectors within each block of the adjacent blocks.

Yet another aspect of the present invention provides an image encoding/decoding apparatus and method that may predict a motion vector using a plurality of prediction schemes.

According to an aspect of the present invention, there is provided an image encoding apparatus, including: a motion vector prediction unit to perform a prediction with respect to an arbitrary motion vector of a current block within an image, using at least one of vector information of a motion vector corresponding to an adjacent block and vector information of a previous motion vector of the current block; and a differential determination unit to determine differential information of a motion vector of the current block based on the motion vector predicted in the motion vector prediction unit and an actual motion vector of the current block.

The vector information of the motion vector corresponding to the adjacent block may include at least one of at least one actual motion vector of the adjacent block, at least one motion vector predicted corresponding to the adjacent block, and differential information for each of the motion vectors of the adjacent block.

The vector information of the previous motion vector may include at least one of the previously predicted motion vector (PMV1), actual motion vector (MV1) of the previous motion vector, differential information (MVD1) of the previous motion vector, a motion vector (MV-col) of a block corresponding to the current block within a previously reconstructed reference picture, a motion vector of an adjacent block of the corresponding block, and predetermined offset information.

The motion vector prediction unit may predict the arbitrary motion vector using one of the following Equations:

PMV2=MV_$A$_1,

PMV2=MV_$B$_1,

PMV2=MV_$C$_1,

PMV2=MV_$D$_1,

PMV2=MV_$A$_2,

PMV2=MV_$B$_2,

PMV2=MV_$C$_2,

PMV2=MV_$D$_2,

PMV2=MV_col,

PMV2=median{MV_$A$_1,MV_$B$_1,MV_$C$_1, MV_$A$_2,MV_$B$_2,MV_$C$_2,MV_$D$_2},

PMV2=median{MV_$A$_2,MV_$B$_2,MV_$C$_2, MV_$D$_2,MV1},

PMV2=median{MV_$A$_2,MV_$B$_2,MV_$C$_2,MV1, MV1},

PMV2=avg{MV_$A$_2,MV_$B$_2,MV_$C$_2,MV1, MV1},

PMV2=median{MV_$A$_2,MV_$C$_2,MV1},

PMV2=median{MV_$A$_2,MV_$B$_2,MV1},

PMV2=MV1,

PMV2=median{MV_$A$_2,MV_$B$_2,MV_$C$_2,MV1, MV_col}, and

PMV2=median{MV_$A$_2,MV_$B$_2,MV_$C$_2}+offset, [Equations]

where PMV2 denotes a motion vector of a current block predicted by each of the Equations, MV_$A$_1, MV_$B$_1, MV_$C$_1 denotes a first motion vector of the adjacent block, MV_$A$_2, MV_$B$_2, MV_$C$_2, MV_$D$_2 denotes a second motion vector of the adjacent block, MV1 denotes the previous motion vector of the current block, MV_col denotes a motion vector of the corresponding block of the current block within the reference picture, and offset denotes a predetermined offset value.

In addition to the above Equations, an equation based on a combination of the vector information associated with the motion vector corresponding to the adjacent block, the vector information associated with the previous motion vector of the current block, the motion vector of the block corresponding to the current block within the previously reconstructed reference picture, the motion vector of the adjacent block of the corresponding block, and information associated with the predetermined offset value may be used.

The image encoding apparatus may further include a scaling unit to perform a scaling with respect to at least one of the vector information of the motion vector corresponding to the adjacent block and the vector information of the previous motion vector of the current block.

The scaling unit may determine whether the scaling is performed based on whether reference pictures of the current block coincide with each other.

The scaling unit may perform the scaling with respect to the vector information of the previous motion vector of the current block using the following Equation:

$$S\_MV1=MV1\times(tb-td)/tb,$$ [Equation]

where S_MV1 denotes a predicted first motion vector where the scaling is performed, MV1 denotes a first actual motion vector, tb denotes a distance from a first reference picture to a target image, and td denotes a distance from the first reference picture to a second reference picture.

The motion vector prediction unit may obtain a second motion vector based on the first motion vector. The motion vector prediction unit may obtain a second motion vector candidate 1 by scaling the first motion vector for the second reference picture, and may obtain the second motion vector based on the second motion vector candidate 1 and adjacent blocks neighboring a block corresponding to the second motion vector candidate 1 in the second reference picture. In this example, information associated with the first motion vector may be stored or transmitted. However, information associated with the second motion vector obtained based on the first motion vector may not be stored or transmitted.

When the motion vector prediction unit predicts n motion vectors, the motion vector prediction unit may store or transmit the information associated with the first motion vector that is already encoded, and may obtain each of the second motion vector through n motion vector based on a corresponding previous motion vector that is already encoded. A predicted value (PMV(i)) of an $i^{th}$ motion vector (MV(i)) may be expressed by the following equation:

$$PMV(i)=MV(i)-MV(i-1),$$

where i=2, . . . , n, and vector information of the $i^{th}$ motion vector that may be stored or transmitted may be MVD(i) expressed by the following equation:

$$MVD(i)=MV(i)-PMV(i).$$

The motion vector prediction unit may perform the prediction by selecting at least one of the vector information of the motion vector corresponding to the adjacent block and the vector information of the previous motion vector of the current block based on similarity estimated among motion vectors within each block of adjacent blocks.

The motion vector prediction unit may include a similarity determination unit to estimate the similarity among the motion vectors within each block of the adjacent blocks to determine whether the estimated similarity is a predetermined reference value, a vector selection unit to select, as reference information, vector information of the motion vector according to the same reference picture from among vector information of the motion vectors corresponding to the adjacent block when the similarity is the predetermined reference value, and a prediction unit to predict the motion vector of the current block using the selected reference information.

The vector selection unit may select, as the reference information, at least one of the vector information of the motion vector corresponding to the adjacent block and the vector information of the previous motion vector of the current block.

At least two prediction units may be included, and the at least two prediction units predict at least two motion vectors with respect to the current block, respectively.

According to another aspect of the present invention, there is provided an image decoding apparatus, including: a motion vector prediction unit to perform a prediction with respect to an arbitrary motion vector of a current block within an image using at least one of vector information of a motion vector corresponding to an adjacent block and vector information of a previous motion vector of the current block; and an adder to add the predicted motion vectors based on differential information of the current block to calculate a motion vector of the current block.

The vector information of the motion vector corresponding to the adjacent block may include at least one of at least one actual motion vector of the adjacent block, at least one predicted motion vector corresponding to the adjacent block, and differential information for each of the motion vectors of the adjacent block.

The vector information of the previous motion vector may include at least one of the previously predicted motion vector (PMV1), an actual motion vector (MV1) of the previous motion vector, differential information (MVD1) of the previous motion vector, a motion vector (MV_col) of a block corresponding to the current block within a previously reconstructed reference picture, a motion vector of the adjacent block of the corresponding block, and predetermined offset information.

According to still another aspect of the present invention, there is provided an image encoding apparatus, including: a plurality of motion vector prediction units to perform a prediction with respect to an arbitrary motion vector of a current block within an image using at least one of vector information of a motion vector corresponding to the adjacent block and vector information of a previous motion vector of the current block; a plurality of differential determination units to respectively determine the differential information of the motion vector predicted by the plurality of motion vector prediction units, using the actual motion vector of the current block; and a prediction determination unit to select a motion vector predicted closest to the actual motion vector based on the determined plurality of differential information, and to determine, as a prediction motion vector corresponding to the current block, the selected motion vector.

The prediction determination unit may generate a prediction index indicating a prediction scheme of predicting the selected motion vector.

According to yet another aspect of the present invention, there is provided an image decoding apparatus, including: a motion vector prediction unit to perform a prediction with respect to an arbitrary motion vector of a current block within an image, in a prediction scheme using at least one of vector information of a motion vector corresponding to an adjacent block and vector information of a previous motion vector of the current block; and an adder to add the predicted motion vector based on differential information of the current block to calculate a motion vector of the current block.

When a prediction index indicating an arbitrary prediction scheme corresponding to the current block exists, the motion vector prediction unit may predict the motion vector of the current block in a prediction scheme according to the prediction index.

According to a further aspect of the present invention, there is provided an image encoding method, including: performing a prediction with respect to an arbitrary motion vector of a current block within an image, using at least one of vector information of a motion vector corresponding to an adjacent block and vector information of a previous motion vector of the current block; and determining differential information of a motion vector of the current block based on the predicted motion vector and vector information and an actual motion vector of the current block.

According to a further aspect of the present invention, there is provided an image decoding method, including:
performing a prediction with respect to an arbitrary motion vector of a current block within an image, using at least one of vector information of a motion vector corresponding to an adjacent block and vector information of a previous motion vector of the current block; and adding the predicted motion vectors based on differential information of the current block to calculate a motion vector of the current block.

Additional aspects, features, and/or advantages of the invention will be set forth in part in the description which follows and, in part, will be apparent from the description, or may be learned by practice of the invention.

Effect

According to embodiments of the present invention, there is provided an image encoding/decoding apparatus and method that may predict a motion vector in effective and various schemes when compressing and encoding an image, thereby obtaining image compression effects in a high efficiency.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIG. 7 illustrates a configuration of an image decoding apparatus corresponding to an image encoding apparatus of FIG. 2;

DETAILED DESCRIPTION

Figure 1:
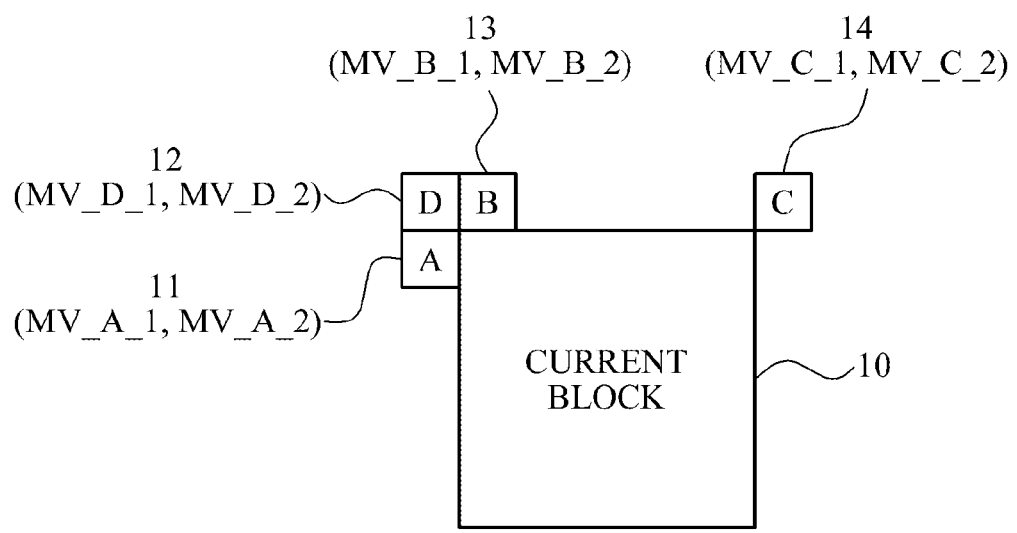
FIG. 1 illustrates a block predicted by a conventional video image coding scheme.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

When detailed descriptions related to a well-known related function or configuration are determined to make the spirits of the present invention ambiguous, the detailed descriptions will be omitted herein. Also, terms used throughout the present specification are used to appropriately describe exemplary embodiments of the present invention, and thus may be different depending upon a user and an operator's intention, or practices of application fields of the present invention. Therefore, the terms must be defined based on descriptions made through the present invention.

Figure 2:
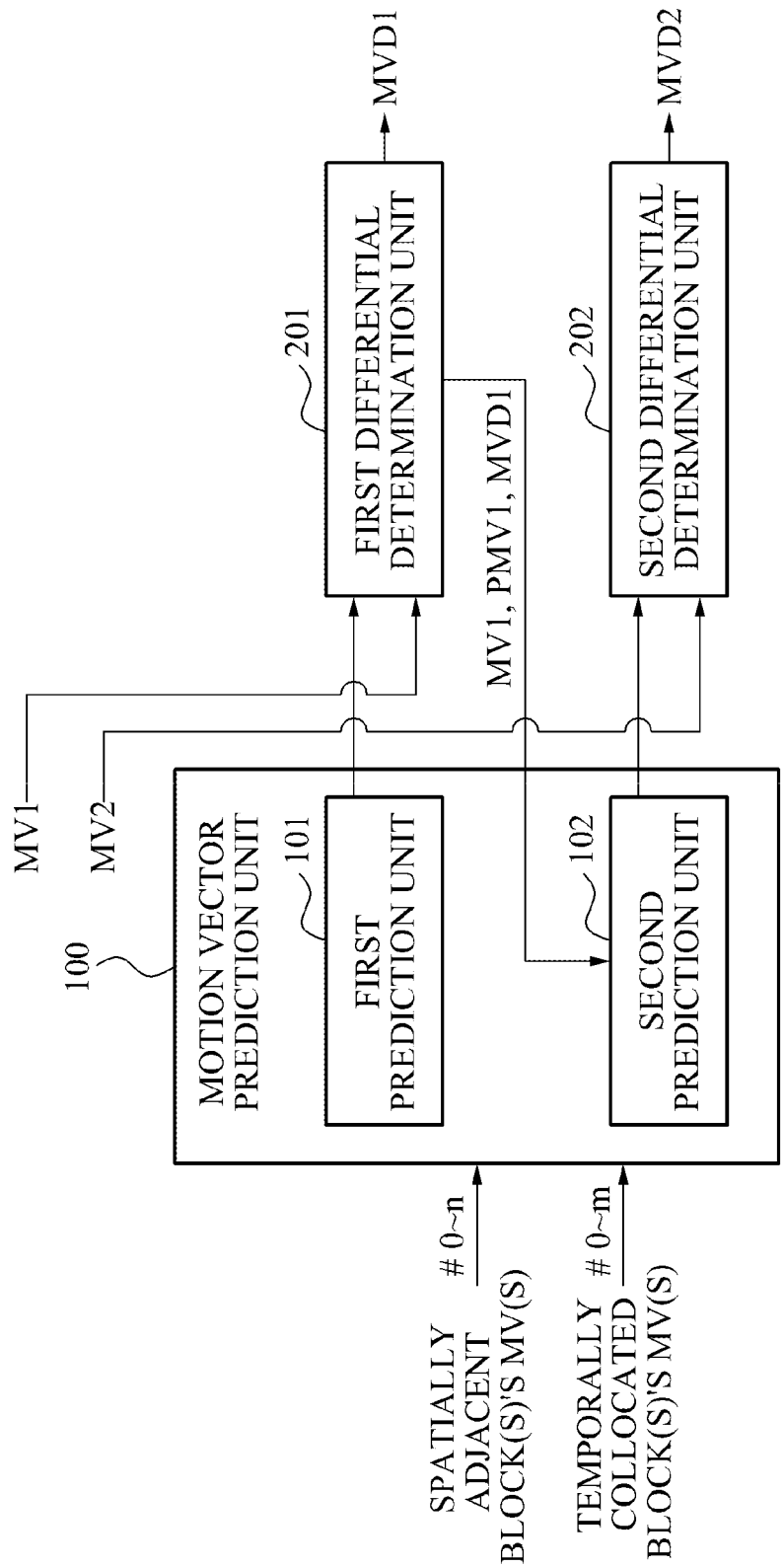
FIG. 2 illustrates a configuration of an image encoding apparatus according to an embodiment of the present invention.

FIG. 2 illustrates a configuration of an image encoding apparatus according to an embodiment of the present invention.

In this instance, the image encoding apparatus may be implemented by predicting at least one motion vector (for example, a forward movement motion vector, a backward movement motion vector, a luminance motion vector, a chrominance motion vector, and the like) with respect to respective macro blocks (or blocks) of a B Slice (bi-predictive slices). Hereinafter, the at least one motion vector may be referred to as a first motion vector and a second motion vector.

Hereinafter, a block may denote an image encoding unit and an image decoding unit. When a single image is encoded or decoded, the single image is divided into multiple blocks and encoding or decoding may be performed based on the encoding unit and decoding unit. Therefore, the encoding unit and decoding unit may be referred to as the block, a macroblock, a coding unit, a prediction unit, and the like. A single block may be divided into smaller sub-blocks.

The motion vector may denote a vector value with respect to motion information and may be expressed by two or more dimensions, and may be generally in a form of (x, y). Even though the motion vector is expressed to indicate a vector (x, y), the motion vector includes values of elements of the motion vector, such as x and y.

The first motion vector may correspond to a first reference picture of a current picture (for example, an image within a list 0 in H.264/AVC standard), and the second motion vector may correspond to a second reference picture of the current picture (for example, an image within a list 1 in H.264/AVC standard).

The first motion vector may correspond to a second reference picture of the current picture (for example, the image within the list 1 in H.264), and the second motion vector may correspond to the first reference picture of the current picture, for example, the image within the list 0 in H.264.

The first motion vector may correspond to the first reference picture of the current image, for example, the image within the list 0 in H.264, and the second motion vector may correspond to the first reference picture of the current picture, for example, the image within the list 0 in H.264.

The first motion vector may correspond to the second reference picture of the current image, for example, the image within the list 1 in H.264, and the second motion vector may correspond to the second reference picture of the current picture, for example, the image within the list 1 in H.264.

The list 0 and the list 1 may use the same reference picture or different reference pictures.

Referring to FIG. 2, the encoding apparatus includes a motion vector (MV) prediction unit 100 and at least one MV differential determination units (MVD1 and MVD 2) 201 and 202.

The motion vector prediction unit 100 may predict a motion vector corresponding to a current block using at least one of vector information of a motion vector corresponding to an adjacent block and vector information of a previous motion vector of the current block.

In this instance, the vector information of the motion vector corresponding to the adjacent block may include at least one of at least one actual motion vector of the adjacent block, at least one predicted motion vector corresponding to the adjacent block, and differential information for each motion vector of the adjacent block.

Also, the vector information of the previous motion vector may include at least one of the previously predicted motion vector (PMV1), actual motion vector (MV1) of the previous motion vector, differential information (MVD1) of the previous motion vector, a motion vector (MV_col) of a block corresponding to the current block within a previously reconstructed reference picture, a motion vector of an adjacent block of the corresponding block, and predetermined offset information.

Accordingly, the motion vector prediction unit 100 may receive a motion vector corresponding to the adjacent block, such as a motion vector (spatially adjacent block(s)'s MV(s)) corresponding to an adjacent block in 0 through n current pictures, and a motion vector (temporally collocated block(s)'s MV(s)) corresponding to a block corresponding to 0 through m current blocks within a reference picture and the adjacent block of the corresponding block.

The motion vector prediction unit 100 may include a first prediction unit 101 for predicting the first motion vector of the current block, and a second prediction unit 202 for predicting the second motion vector of the current block.

The first prediction unit 101 may use one of vector information of motion vectors corresponding to the adjacent blocks.

The first prediction unit 101 may use at least one of Equation 1 through Equation 10.

$$PMV1=MVA1 \quad \text{[Equation 1]}$$

$$PMV1=MVB1 \quad \text{[Equation 2]}$$

$$PMV1=MVC1 \quad \text{[Equation 3]}$$

$$PMV1=MVD1 \quad \text{[Equation 4]}$$

$$PMV1=MVA2 \quad \text{[Equation 5]}$$

$$PMV1=MVB2 \quad \text{[Equation 6]}$$

$$PMV1=MVC2 \quad \text{[Equation 7]}$$

$$PMV1=MVD2 \quad \text{[Equation 8]}$$

$$PMV1=MV\_col \quad \text{[Equation 9]}$$

$$PMV1=\text{median}\{MV\_A\_1, MV\_B\_1, MV\_C\_1, MV\_A\_2, MV\_B\_2, MV\_C\_2, MV\_D\_1\}. \quad \text{[Equation 10]}$$

Here, PMV1 denotes a first motion vector of a current block predicted by each Equation, MV_A_1, MV_B_1, MV_C_1, and MV_D_1 respectively denote a first motion vector of an adjacent block, MV_A_2, MV_B_2, MV_C_2, and MV_D_2 respectively denote a second motion vector of the adjacent block, and MV_col denotes a motion vector of a block corresponding to the current block within a reference picture of the current block.

In addition, the first prediction unit 101 may use at least one of the motion vector MV_col of the block corresponding to the current block within the reference picture of the current block, and blocks adjacent to the block corresponding to the current block within the reference picture of the current block, to predict the first motion vector.

The first differential determination unit 200 may determine differential information (MVD1) between a first predicted motion vector (PMV1) of the current block and a first actual motion vector (MV 1).

The second prediction unit 102 may predict the second motion vector of the current block using at least one of vector information of a motion vector corresponding to an adjacent block and vector information of a previous motion vector of the current block.

Accordingly, the second prediction unit 102 may use at least one of the following Equations 11 to 28.

$$PMV2=MVA1 \qquad \text{[Equation 11]}$$

$$PMV2=MVB1 \qquad \text{[Equation 12]}$$

$$PMV2=MVC1 \qquad \text{[Equation 13]}$$

$$PMV2=MVD1 \qquad \text{[Equation 14]}$$

$$PMV2=MVA2 \qquad \text{[Equation 15]}$$

$$PMV2=MVB2 \qquad \text{[Equation 16]}$$

$$PMV2=MVC2 \qquad \text{[Equation 17]}$$

$$PMV2=MVD2 \qquad \text{[Equation 18]}$$

$$PMV2=MV\_col$$

$$PMV2=\text{median}\{MV\_A\_1, MV\_B\_1, MV\_C\_1, MV\_A\_2, MV\_B\_2, MV\_C\_2, MV\_D\_2\} \qquad \text{[Equation 20]}$$

$$PMV2=\text{median}\{MV\_A\_2, MV\_B\_2, MV\_C\_2, MV\_D\_2, MV1\} \qquad \text{[Equation 21]}$$

$$PMV2=\text{median}\{MV\_A\_2, MV\_B\_2, MV\_C\_2, MV1, MV1\} \qquad \text{[Equation 22]}$$

$$PMV2=\text{avg}\{MV\_A\_2, MV\_B\_2, MV\_C\_2, MV1, MV1\} \qquad \text{[Equation 23]}$$

$$PMV2=\text{median}\{MV\_A\_2, MV\_C\_2, MV1\} \qquad \text{[Equation 24]}$$

$$PMV2=\text{median}\{MV\_A\_2, MV\_B\_2, MV1\} \qquad \text{[Equation 25]}$$

$$PMV2=MV1 \qquad \text{[Equation 26]}$$

$$PMV2=\text{median}\{MV\_A\_2, MV\_B\_2, MV\_C\_2, MV1, MV\_col\} \qquad \text{[Equation 27]}$$

$$PMV2=\text{median}\{MV\_A\_2, MV\_B\_2, MV\_C\_2\}+\text{offset} \qquad \text{[Equation 28]}$$

Here, PMV2 denotes a second motion vector of a current block predicted by each Equation, MV_A_1, MV_B_1, and MV_C_1 respectively denote a first motion vector of an adjacent block, MV_A_2, MV_B_2, MV_C_2, and MV_D_2 respectively denote a second motion vector of an adjacent block, MV1 denotes a previous motion vector of a current block, MV_col denotes a motion vector of a block corresponding to a current block within a previously reconstructed reference picture, and offset denotes a predetermined offset value.

In this instance, the predetermined offset value may be one of differential information (MVD1) of a first motion vector (MV1) of a current block, and differential information of each motion vector corresponding to an adjacent block (for example, differential information (MV_A_2_D) of a second motion vector (MV_A_2) of an adjacent block (A), and differential information (MV_B_2_D) of a second motion vector (MV_B_2) of an adjacent block (B)). Also, the offset may be previously scaled.

The second differential determination unit 201 may determine differential information (MVD2) between a second predicted motion vector (PMV2) of the current block and a second actual motion vector (MV2).

In this instance, the second differential determination unit 202 may use one of the following Equations 29 to 31.

$$MVD2=MV2-PMV2 \qquad \text{[Equation 29]}$$

$$MVD2=\text{offset2} \qquad \text{[Equation 30]}$$

In this instance, offset2 may be one of $\{-n, -(n-\alpha), -(n-2\alpha) \ldots 0, \ldots, -(n-2\alpha), n-\alpha, n\}$. Also, n denotes a positive integer including 0, and $\alpha$ denotes a positive real number including 0.

$$MVD2 = \frac{\min}{\text{offset 2}} \{\text{offset2} - (MV2 - PMV2)\} \qquad \text{[Equation 31]}$$

In this instance, a value of offset2 may be designated as a plurality of candidates such as $\{-0.5, 0, 0.5\}$. In this case, the second differential determination unit 202 may select, as differential information of the second motion vector of [Equation 28], a value closest to a difference with an actual motion vector among candidate values of the offset2.

In addition to Equations 1 to 31, an equation based on a combination of the vector information associated with the motion vector corresponding to the adjacent block, the vector information associated with the previous motion vector of the current block, the motion vector of the block corresponding to the current block within the previously reconstructed reference picture, the motion vector of the adjacent block of the corresponding block, and information associated with the predetermined offset value may be used.

Although two motion vector prediction units and two differential determination units are used in example embodiments, a number of vector prediction units and a number of differential determination units may be determined based on a number of motion vectors of the current block.

The motion vector prediction unit 100 may temporally scale at least one of vector information to be used when predicting the motion vector of the current block.

Figure 3:
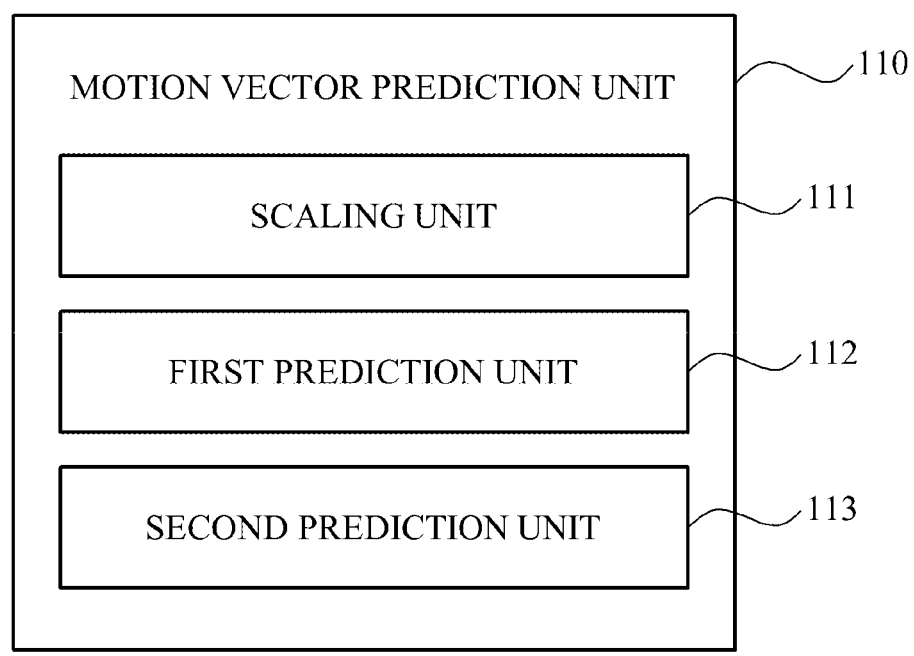
FIG. 3 illustrates another example of a motion vector prediction unit of FIG. 2.

FIG. 3 illustrates another example of a motion vector prediction unit of FIG. 2

Referring to FIG. 3, the motion vector prediction unit 110 may include a scaling unit 111, a first prediction unit 112, and a second prediction unit 113.

The scaling unit 111 may temporally scale at least one of vector information of a motion vector corresponding to an adjacent block and vector information of a previous motion vector of the current block, and transmit the scaled vector information to the first prediction unit 112 and the second prediction unit 113.

When the scaling unit 111 is implemented by scaling the first motion vector of the vector information of the motion vector corresponding to the adjacent block and the vector information of the previous motion vector of the current block, a scaling process of the first motion vector is performed which is further described with reference to FIG. 4.

Figure 4:
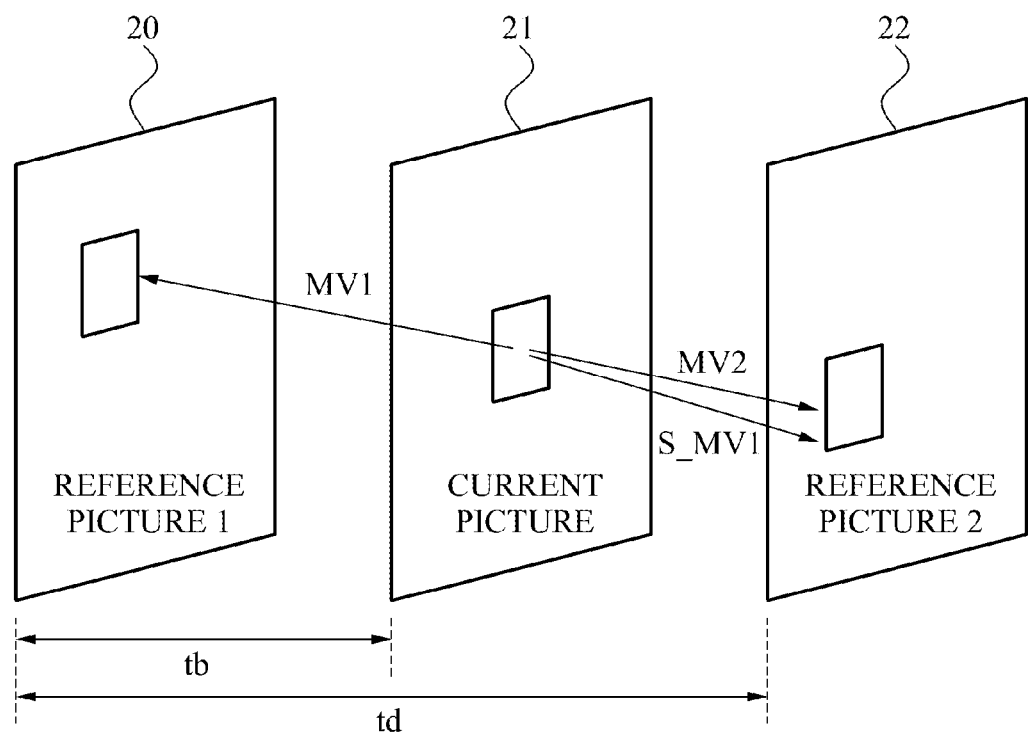
FIG. 4 illustrates a scaling process of a scaling unit of FIG. 2.

FIG. 4 illustrates a scaling process of a scaling unit of FIG. 3.

Referring to FIG. 4, a current picture 21 and a plurality of reference pictures 20 and 22 (hereinafter, referred to as a first reference picture and a second reference picture) are illustrated, and arranged in a temporal order. The scaling unit 111 may scale a first motion vector (MV1) using the following Equation 32.

$$S\_MV1 = MV1 \times (tb-td)/tb,$$

Here, S_MV1 denotes a first scaled motion vector, tb denotes a distance between a first reference picture 20 and a current picture 21, and td denotes a distance between the first reference picture 20 and a second reference picture 22. Here, a sign and a value of each of tb and td may be determined in a temporal order of a display.

For example, when assuming that the first reference picture 20 is a (n−1)-th display order, the current picture is an n-th display order, the second reference picture 22 is a (n+2)-th display order, tb may satisfy tb={n−(n−1)} and td may satisfy td={(n+2)−(n−1)}. Also, when assuming that the first reference picture 20 is a (n−1)-th display order, the current picture is an n-th display order, the second reference picture 22 is a (n−2)-th display order, tb may satisfy tb={n−(n−1)}, and td may satisfy td={(n−2)−(n−1)}.

The first prediction unit 112 may predict the first motion vector of the current block using at least one of vector information of a motion vector corresponding to an adjacent block and the scaled vector information (for example, an arbitrary motion vector corresponding to the adjacent block).

The second prediction unit 113 may predict a second motion vector of the current block using at least one of the vector information of the motion vector corresponding to the adjacent block, vector information of a previous motion vector of the current block, and the scaled vector information (for example, each vector information of the first motion vector).

When the scaling unit 111 scales the first motion vector (MV1), the second prediction unit 113 may use the following Equation 33.

$$PMV2 = \text{median}\{MV\_A\_2, MV\_B\_2, MV\_C\_2, MV\_D\_2, S\_MV1\} \quad \text{[Equation 33]}$$

Also, the second prediction unit 113 may use the scaled vector information (first scaled motion vector (S_MV1)) instead of using existing vector information (for example, the first motion vector (MV1)) that is not scaled in Equations 1 to 31.

Accordingly, the first prediction unit 112 and the second prediction unit 113 may more accurately predict each motion vector of the current block using vector information obtained by correcting temporal inconsistency occurring in the adjacent block or the current block.

The scaling unit 111 may determine whether the scaling operation is performed depending on whether the reference pictures of the current block coincide with each other.

Specifically, the scaling unit 111 may determine whether a reference picture (ref_pic_alpha) of a motion vector (MV_alpha) to be referred to and a reference picture (ref_pic_current) of a motion vector (MV_current) of a current block to be encoded are different from each other. When the reference picture (ref_pic_alpha) and the reference picture (ref_pic_current) are different from each other, the scaling unit 111 may temporally scale the motion vector (MV_alpha) to be referred to, based on the motion vector (MV_current) of the current bock.

The second prediction unit 113 may obtain the second motion vector based on the first motion vector. The second prediction unit 113 may obtain a second motion vector candidate 1 by scaling the first motion vector for the second reference picture, as illustrated in FIG. 4, and may obtain the second motion vector based on the second motion vector candidate 1 and adjacent blocks neighboring a block corresponding to the second motion vector candidate 1 in the second reference picture. In this example, information associated with the first motion vector may be stored or transmitted. However, information associated with the second motion vector obtained based on the first motion vector may not be stored or transmitted. An encoding apparatus and a decoding apparatus may be embodied without the second differential determination unit 202.

Figure 5:
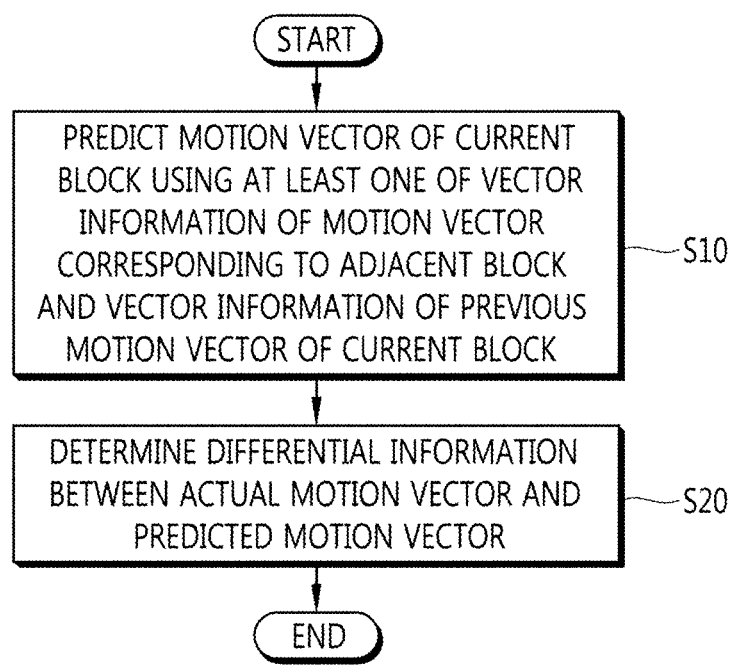
FIGS. 5, 6A, and 6B are flowcharts illustrating an image encoding method according to an embodiment of the present invention.
Figure 6A:
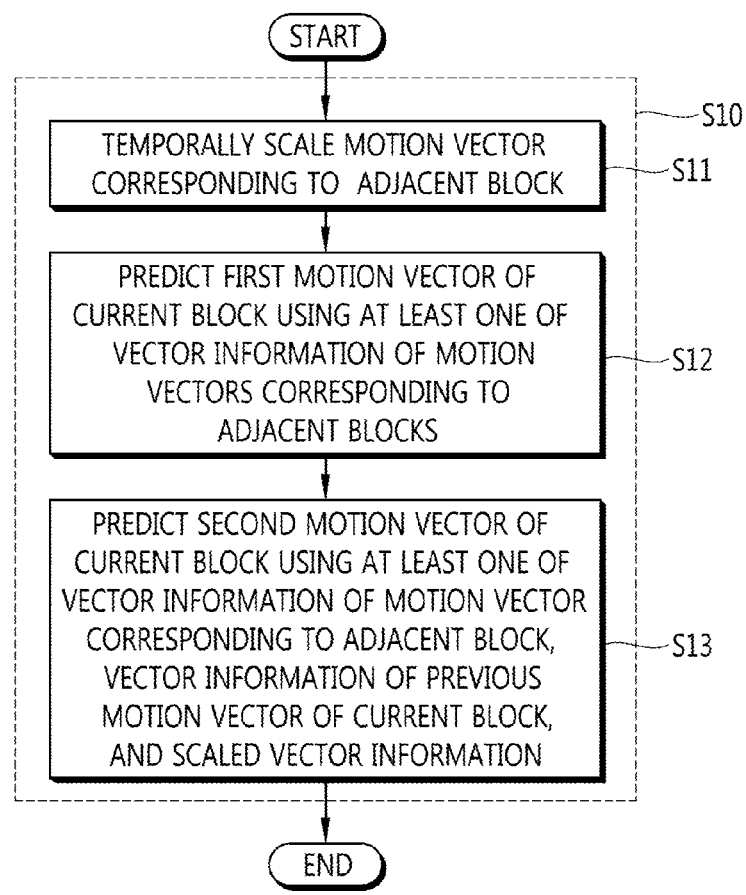
Figure 6B:
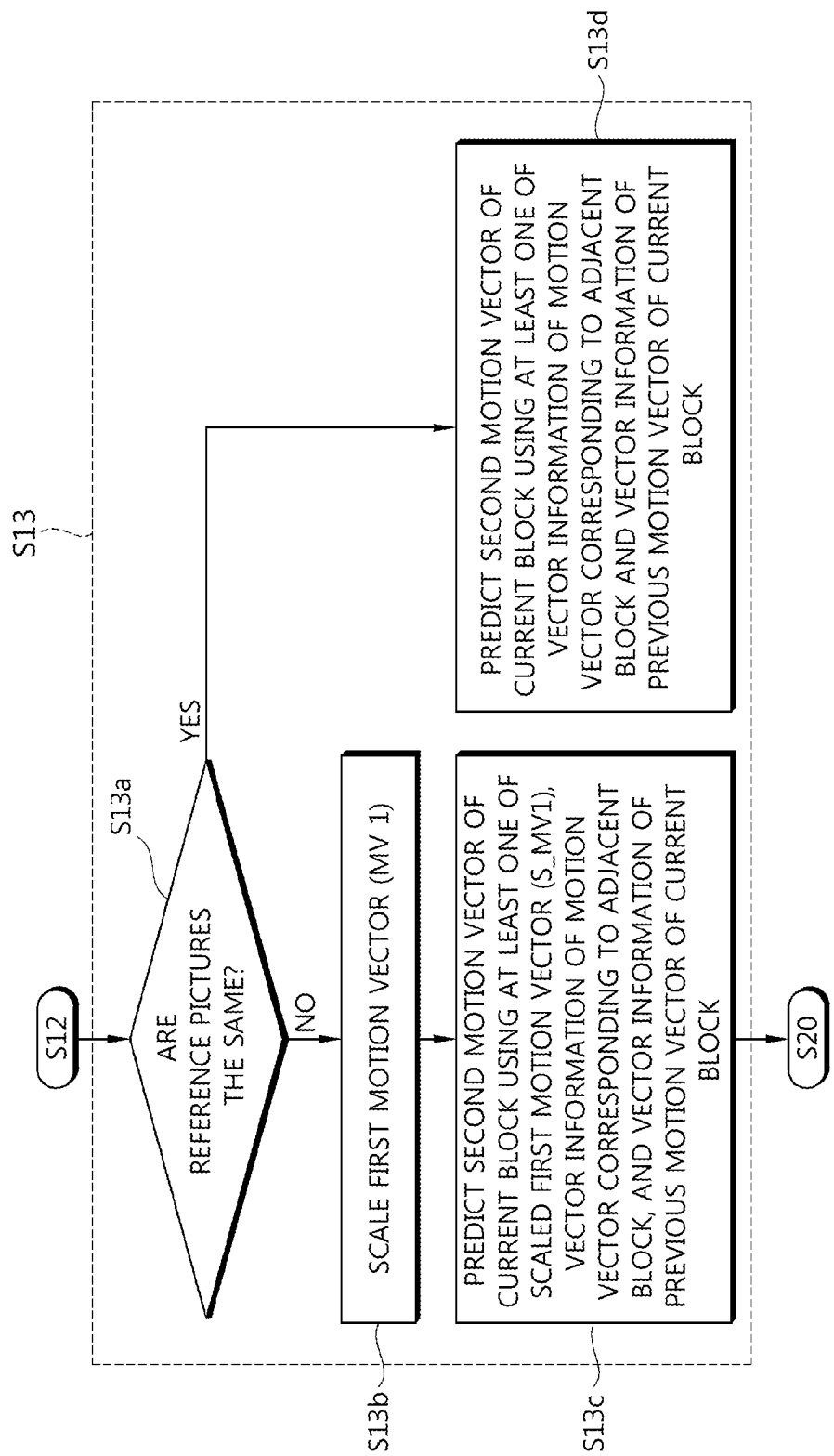

FIGS. 5, 6A, and 6B are flowcharts illustrating an image encoding method according to an embodiment of the present invention.

FIG. 5 is a flowchart illustrating an image encoding method according to an embodiment.

Referring to FIG. 5, in operation S10, the motion vector prediction unit 100 may predict a motion vector of a current block using at least one of vector information of a motion vector corresponding to an adjacent block and vector information of a previous motion vector of a current block.

When a currently predicted motion vector is a first motion vector, the first prediction unit 101 may predict the first motion vector for the current bock using at least one of vector information of the motion vectors corresponding to the adjacent blocks. When the currently predicted motion vector is a second motion vector, the second prediction unit 102 may predict the second motion vector for the current block using at least one of the vector information of the motion vector corresponding to the adjacent block and the vector information of the previous motion vector of the current block.

In operation S20, the first differential determination unit 200 or the second differential determination unit 201 may determine differential information (MVD1 or MVD2) between an actual motion vector (MV1 or MV2) and the motion vector (PMV1 or PMV2) predicted in operation S10.

The motion vector prediction unit 100 may determine whether all predictions of the motion vectors for the current block are performed, and request to perform operation S10 when all predictions are not performed.

Operation S10 may include an operation of temporally scaling at least one (for example, a motion vector corresponding to an adjacent block) of the vector information of the previous motion vector of the current block.

Operation S10 may include operations S11, S12, and S13 of FIG. 6A.

Referring to FIG. 6A, in operation S11, the scaling unit 111 may temporally scale the motion vector corresponding to the adjacent block.

In operation S12, the first prediction unit 112 may predict the first motion vector of the current block using at least one of the vector information of the motion vectors corresponding to the adjacent blocks.

In operation S13, the second prediction unit 113 may predict the second motion vector of the current block using at least one of the vector information of the motion vector corresponding to the adjacent block, the vector information of the previous motion vector of the current block, and the scaled vector information.

Also, the scaling unit 111 may determine whether the temporal scaling is necessary depending on information regarding whether reference pictures of the current block coincide with each other.

Accordingly, operation S13 may include operations of FIG. 6B.

Here, it is assumed that the scaling unit 111 scales the first motion vector (MV1).

Referring to FIG. 6B, in operation S13a, the scaling unit 111 may determine whether a first reference picture 20 and a second reference picture 22 of the current block are different from each other.

In operation S13b, when the first reference picture 20 and the second reference picture 22 are different from each other based on the determination result of operation S13a, the scaling unit 111 may scale the first motion vector (MV1).

In operation S13c, the second prediction unit 113 may predict the second motion vector of the current block using at least one of the first motion vector (S_MV1) scaled in operation S13b, the vector information of the motion vector corresponding to the adjacent block, and the vector information of the previous motion vector of the current block.

In operation S13d, when the first reference picture 20 and the second reference picture 22 are not different from each other based on the determination result of the operation S13a, the second prediction unit 113 may predict the second motion vector of the current block using at least one of the vector information of the motion vector corresponding to the adjacent block and the vector information of the previous motion vector of the current block.

FIG. 7 illustrates a configuration of an image decoding apparatus corresponding to an image encoding apparatus of FIG. 2.

Referring to FIG. 7, the decoding apparatus may include a motion vector prediction unit 300 and at least one adder 400.

The motion vector prediction unit 300 may include a first prediction unit 301 and a second prediction unit 302 to predict a motion vector (for example, a first motion vector and a second motion vector) of each block from an inputted image stream. In this instance, the inputted image stream may be a result obtained such that an image is encoded by the encoding apparatus of FIG. 2.

The motion vector prediction unit 300 may predict each motion vector of the current block using at least one of vector information of a motion vector corresponding to an adjacent block and vector information of a previous motion vector of a current block. In this example, the motion vector prediction unit 300 may operate in the same manner as the motion vector prediction unit 100 of the encoding apparatus of FIG. 2.

In particular, the first prediction unit 301 may predict the first motion vector of the current block using at least one of the vector information of the motion vectors corresponding to the adjacent block.

The first adder 400 may add the predicted first motion vectors (PMV1) using differential information (MVD1) for the first motion vector of the current block to calculate a first motion vector (MV1).

The second prediction unit 302 may predict the second motion vector of the current block using at least one of the vector information of the motion vector corresponding to the adjacent block and the vector information of the previous motion vector of the current block. The second adder 401 may add the predicted second motion vectors (PMV2) using differential information (MVD2) for the second motion vector of the current block to calculate a second motion vector (MV2).

Although two motion vector prediction units and two adders are used in example embodiments, a number of vector prediction units and a number of adders may be determined based on a number of motion vectors of the current block.

Figure 8:
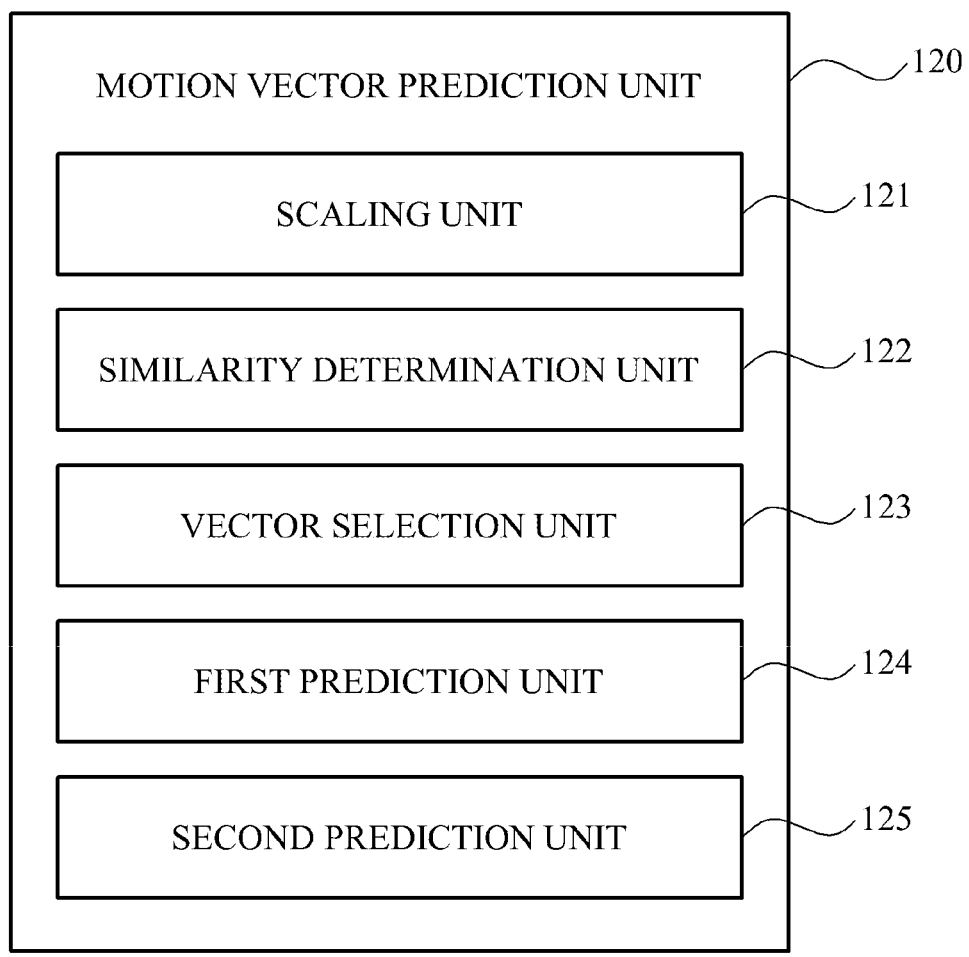
FIG. 8 illustrates another example of a motion vector prediction unit of FIG. 2.

FIG. 8 illustrates another example of the motion vector prediction unit 120 of FIG. 2.

The other example of the motion vector prediction unit 120 may be a case where vector information selected, from vector information of a previous motion vector of the current block and vector information of a motion vector corresponding to an adjacent block, based on similarity among motion vectors within each block of adjacent blocks is used when predicting the motion vector of the current block.

Referring to FIG. 8, the motion vector prediction unit 120 may include a scaling unit 121, a similarity determination unit 122, a vector selection unit 123, a first prediction unit 124, and a second prediction unit 125.

The scaling unit 121 may temporally scale at least one of the vector information of the motion vector corresponding to the adjacent block and the vector information of the previous motion vector of the current block (for example, differential information of the first motion vector).

The similarity determination unit 122 may estimate similarity among motion vectors within each block of the adjacent blocks with respect to the respective adjacent blocks, and determine whether the estimated similarity is greater than a predetermined reference value.

In this instance, the similarity determination unit 122 may calculate a difference among the respective motion vectors (for example, a first motion vector and a second motion vector of an adjacent block A) within each block of the adjacent blocks, and regard the calculated difference as the similarity.

When the estimated similarity is not greater than the predetermined reference value, the vector selection unit 123 may select, as reference information, vector information of a motion vector according to the same reference picture among vector information of the motion vectors corresponding to the adjacent block.

When the estimated similarity is greater than the predetermined reference value, the vector selection unit 123 may select, as the reference information, at least one of the vector information of the previous motion vector of the current block and the vector information of the motion vector corresponding to the adjacent block.

The first prediction unit 124 and the second prediction unit 125 may predict the respective motion vectors of the current block using the reference information selected by the vector selection unit 123.

The second prediction unit 302 may obtain the second motion vector based on the first motion vector. The second prediction unit 302 may obtain a second motion vector candidate 1 by scaling the first motion vector for the second reference picture, as illustrated in FIG. 4, and may obtain the second motion vector based on the second motion vector candidate 1 and adjacent blocks neighboring a block corresponding to the second motion vector candidate 1 in the second reference picture. In this example, differential information (MVD1) associated with the first motion vector may be stored or transmitted. However, differential information (MVD2) associated with the second motion vector obtained based on the first motion vector may not be stored or transmitted. Therefore, the second adder 401 of FIG. 7 may determine, as a second motion vector (MV2), a predicted second motion vector information (PMV2) that is predicted in the second prediction unit 302 without using the differential information (MVD2) associated with the second motion vector.

Figure 9:
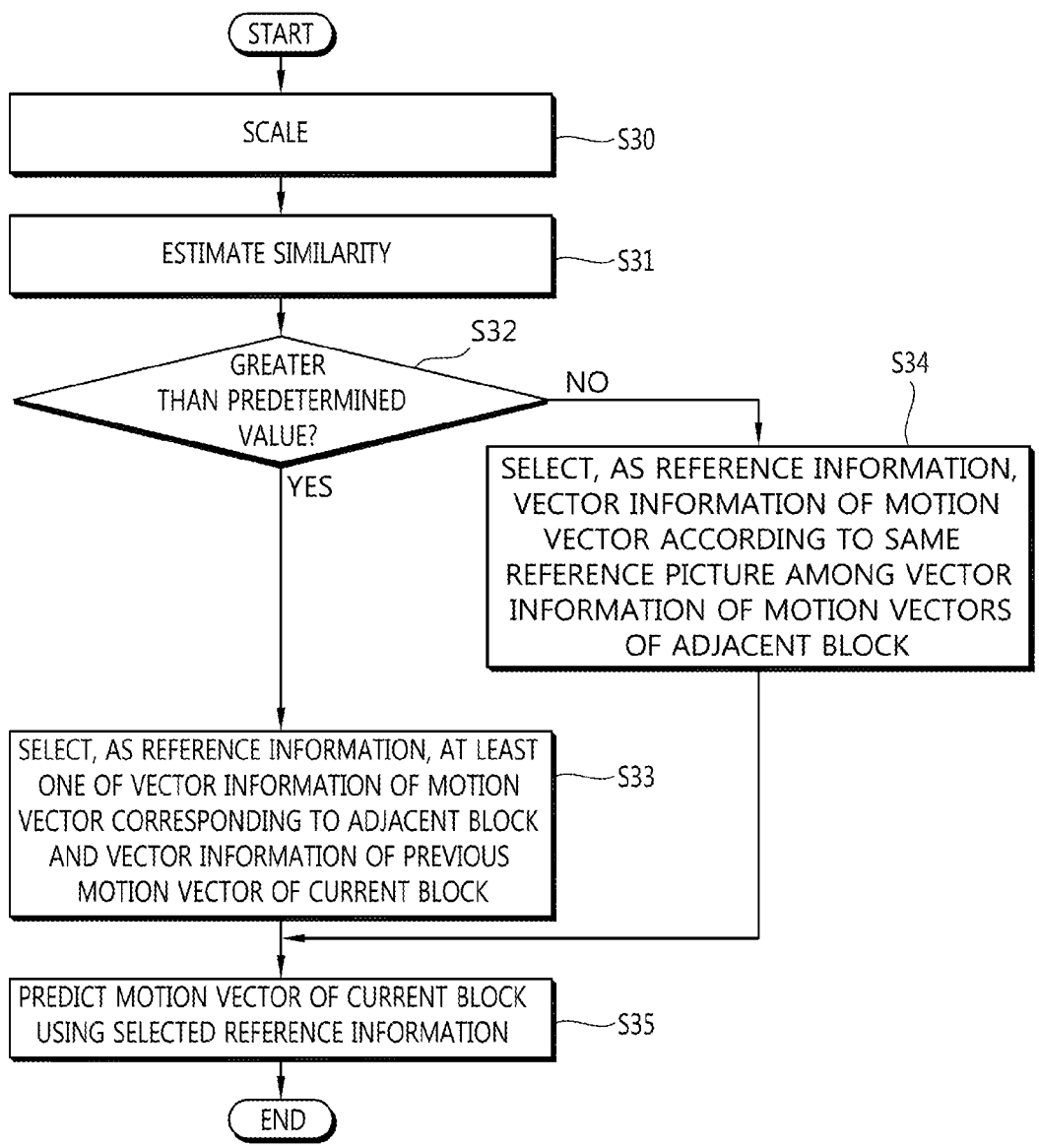
FIG. 9 is a flowchart illustrating operations of a motion vector prediction unit of FIG. 8.

FIG. 9 is a flowchart illustrating operations of a motion vector prediction unit of FIG. 8.

Referring to FIG. 9, in operation S30, the scaling unit 121 may scale at least one of vector information of a motion vector corresponding to an adjacent block and vector information of a previous motion vector of a current bock.

In operation S31, the similarity determination unit 122 may estimate similarity between motion vectors within each block of adjacent blocks with respect to respective adjacent blocks.

In operation S32, the similarity determination unit 122 may determine whether the estimated similarity is greater than a predetermined reference value.

In operation S33, when the similarity is greater than the predetermined reference value based on the determination result of operation S32, the vector selection unit 123 may select, as reference information, at least one of the vector information of the motion vector corresponding to the adjacent block and the vector information of the previous motion vector of the current block.

In operation S34, when the similarity is not greater than the predetermined reference value based on the determination result of operation S32, the vector selection unit 123 may select, as the reference information, vector information of a motion vector according to the same reference picture from among the vector information of the motion vectors of the adjacent block.

In operation S35, the first prediction unit 124 may predict a first motion vector using the reference information selected in operation S33 or operation S34, and the second prediction unit 125 may predict a second motion vector using the reference information selected in operation S33 or operation S34.

Figure 10:
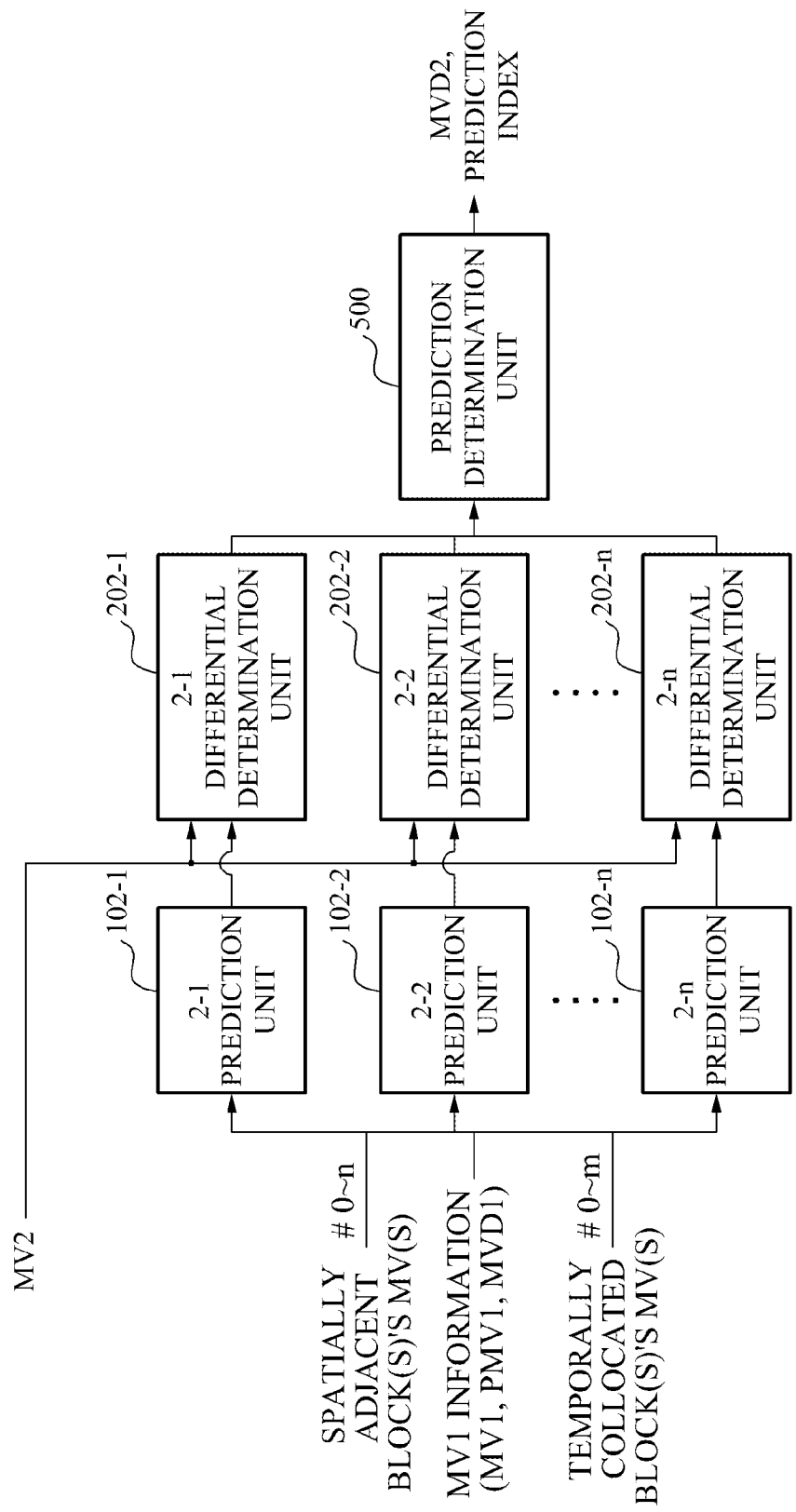
FIG. 10 illustrates a configuration of an image encoding apparatus according to another embodiment of the present invention.
Figure 11:
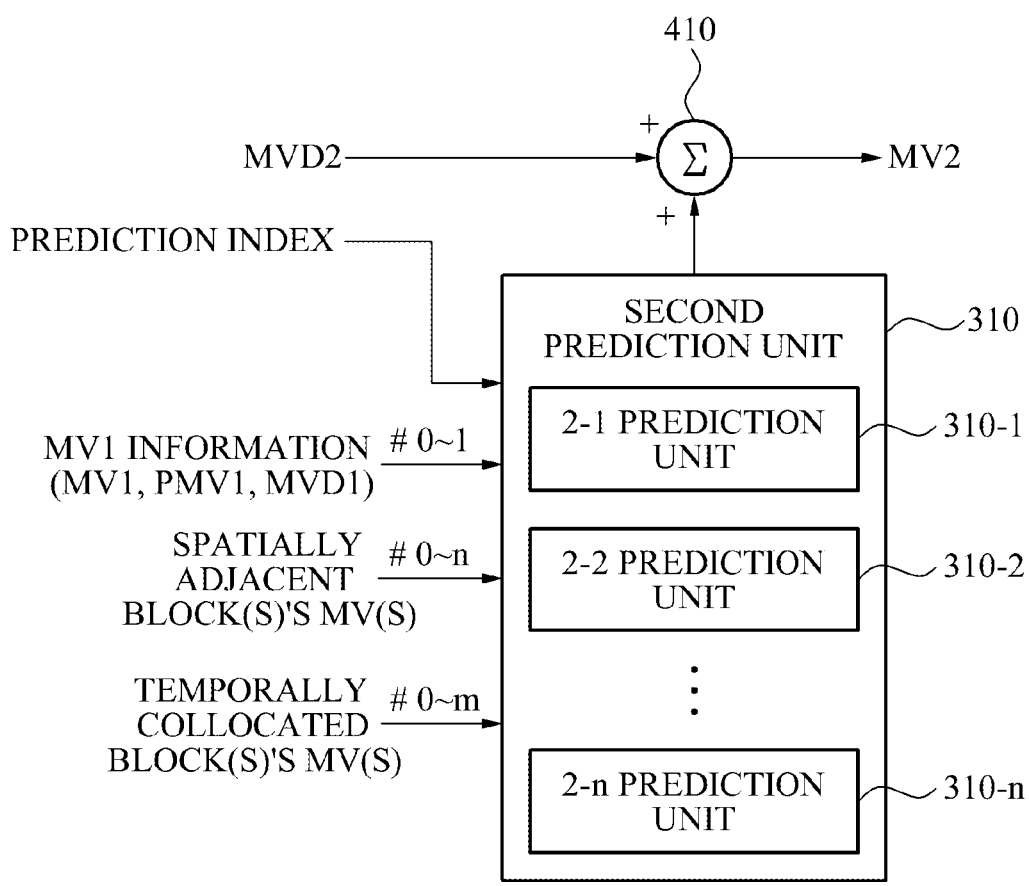
FIG. 11 illustrates a configuration of an image decoding apparatus corresponding to the encoding apparatus of FIG. 10.

FIG. 10 illustrates a configuration of an image encoding apparatus according to another embodiment of the present invention, and FIG. 11 illustrates a configuration of an image decoding apparatus corresponding to the encoding apparatus of FIG. 10.

Referring to FIG. 10, the image encoding apparatus performing a compression process for a motion vector of a current block is illustrated. In this instance, as for the image encoding apparatus of FIG. 10, it is assumed that a second motion vector of a plurality of motion vectors of the current block is predicted.

The encoding apparatus includes a plurality of second prediction units 102-1 to 102-$n$, a plurality of second differential determination units 202-1 to 202-$n$, and a prediction determination unit 500.

Here, the plurality of second prediction units 102-1 to 102-$n$ may respectively predict an arbitrary motion vector (the second motion vector) of the current block in mutually different prediction schemes, using at least one of vector information of a motion vector corresponding to an adjacent block and vector information of a previous motion vector of the current block.

The plurality of second differential determination units 202-1 to 202-$n$ may determine differential information of the motion vector predicted by the respective second prediction units 102-1 to 102-$n$.

Specifically, a 2-1 prediction unit 102-1 may predict the second motion vector in a predetermined prediction scheme (for example, Equation 2) using at least one of the vector information of the motion vector corresponding to the adjacent block and vector information of the previous motion vector of the current block, and a 2-2 prediction unit 102-2 may predict the second motion vector in another prediction scheme (for example, Equation 3).

Similarly, a 2-1 differential determination unit 202-1 may determine differential information with an actual motion vector (MV2) with respect to the second motion vector predicted by the 2-1 prediction unit 102-1, and a 2-2 differential determination unit 202-2 may determine differential information with the actual motion vector (MV2) with respect to the second motion vector predicted by the 2-2 prediction unit 102-2.

The prediction determination unit 500 may select a motion vector selected to be closest to the actual motion vector (MV2) based on inputted respective differential information, and determine the selected motion vector as a prediction motion vector corresponding to the current block.

The prediction determination unit 500 may generate a prediction index indicating a prediction scheme predicting the selected motion vector, and transmit the generated prediction index to the decoding apparatus, together with compression data of an image.

Referring to FIG. 11, the decoding apparatus may include a second prediction unit 310 and an adder 410.

The second prediction unit 310 may include a plurality of second prediction units 310-1 to 310-$n$ which perform mutually different prediction schemes to decode an arbitrary motion vector (second motion vector) of the current block.

For example, the second prediction unit 310 may select a 2-2 prediction unit 310-2 based on the prediction index received together with the compression data of the image, and predict the second motion vector of the current block using the selected 2-2 prediction unit 310-2.

The adder 410 may add differential information (MVD2) of the second motion vector of the current block to the predicted second motion vector (PMV2) to thereby calculate the second motion vector (MV2) of the current block.

The present invention is not limited to predicting two motion vectors, and may predict n motion vectors, that is, at least two motion vectors.

In this example, information associated with a first motion vector may be stored or transmitted, and each of the second motion vector through n motion vector may be obtained based on a corresponding previous motion vector that is already encoded. n may be greater than or equal to '2'. A predicted value (PMV(i)) of an $i^{th}$ motion vector (MV(i)) may be expressed by the following equation:

$$PMV(i)=MV(i)-MV(i-1),$$

where i=2, . . . , n, and vector information of the $i^{th}$ motion vector that may be stored or transmitted may be MVD(i) expressed by the following equation:

$$MVD(i)=MV(i)-PMV(i)$$

The methods according to the above-described embodiments may be recorded in non-transitory computer-readable storage media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Further, the encoding apparatus of the present invention may be implemented in a processing type of a macro block of a B Slice, however, the encoding apparatus may be implemented in a processing type of a macro block of a P Slice. In the case of the macro block of the P Slice, the motion vector for each block may be a single. In this case, the macro block of the P Slice may be used as the first motion vector.

Although a few embodiments have been shown and described, it would be appreciated by those skilled in the art that changes may be made in these embodiments without departing from the principles and spirit of the disclosure, the scope of which is defined by the claims and their equivalents.

What is claimed is:

1. An image decoding apparatus comprising:
   a motion vector prediction unit configured to predict a motion vector of a current block within a current picture using any one or any combination of motion vector information of an adjacent block of the current block, motion vector information of a reference block corresponding to the current block within a first reference picture, and motion vector information of an adjacent block of the reference block corresponding to the current block within the first reference picture; and
   an adder configured to add the predicted motion vector of the current block to differential motion vector information of the current block to calculate a motion vector of the current block;
   wherein the motion vector prediction unit comprises a scaling unit configured to scale the motion vector information of the adjacent block of the current block using a distance from a second reference picture referred to by the adjacent block of the current block to the current picture and a distance from the first reference picture of the current block to the current picture in response to the second reference picture referred to by the adjacent block of the current block being different from the first reference picture of the current block, wherein a position of the reference block within the first reference picture corresponds to a position of the current block within the current picture.

2. The image decoding apparatus of claim 1, wherein the scaling unit is further configured to scale the motion vector information of the reference block corresponding to the current block within the first reference picture or the motion vector information of the adjacent block of the reference block corresponding to the current block within the first reference picture using any one or any combination of a distance from a third reference picture of the reference block to a picture in which the reference block is located, a distance from a fourth reference picture referred to by the adjacent block of the reference block to a picture in which the adjacent block of the reference block is located, and a distance from the first reference picture of the current block to the current picture.

* * * * *